(12) United States Patent
Lebaudy et al.

(10) Patent No.: US 6,543,801 B2
(45) Date of Patent: Apr. 8, 2003

(54) INFLATABLE METAL STRUCTURE WITH BUILT-IN PYROTECHNIC CHARGE

(75) Inventors: Franck Lebaudy, Lardy (FR); Christian Perotto, Ballancourt (FR)

(73) Assignee: Livbag SNC, Pont de Buis (FR)

( * ) Notice: Subject to any disclaimer, the term of this patent is extended or adjusted under 35 U.S.C. 154(b) by 18 days.

(21) Appl. No.: 10/189,397

(22) Filed: Jul. 8, 2002

(65) Prior Publication Data
US 2002/0180185 A1 Dec. 5, 2002

Related U.S. Application Data

(62) Division of application No. 09/655,068, filed on Sep. 5, 2000, now Pat. No. 6,460,873.

(30) Foreign Application Priority Data

Sep. 24, 1999 (FR) .............................. 99 11963

(51) Int. Cl.⁷ ............................................... B60R 21/28
(52) U.S. Cl. ..................... 280/728.1; 280/741; 280/731
(58) Field of Search .......................... 280/728.1, 728.2, 280/731, 728.3, 729, 730.1, 732, 734, 738, 739, 740, 742, 743.1, 743.2

(56) References Cited

U.S. PATENT DOCUMENTS

| | | | |
|---|---|---|---|
| 5,351,977 A | | 10/1994 | Grace |
| 5,366,239 A | | 11/1994 | Headley |
| 5,496,057 A | * | 3/1996 | Niederman .............. 280/728.2 |
| 5,505,488 A | * | 4/1996 | Allard ........................ 280/740 |
| 5,573,270 A | | 11/1996 | Sogi et al. |
| 5,615,914 A | | 4/1997 | Galbraith et al. |
| 5,738,374 A | * | 4/1998 | Marsaud et al. ............ 280/741 |
| 5,839,754 A | * | 11/1998 | Schluter et al. ............ 280/736 |
| 5,839,756 A | | 11/1998 | Schenck et al. |
| 5,854,441 A | | 12/1998 | Metzger |
| 5,868,422 A | | 2/1999 | Galbraith et al. |
| 5,895,069 A | | 4/1999 | Heilig et al. |
| 6,062,143 A | * | 5/2000 | Grace et al. ................ 280/741 |
| 6,126,197 A | * | 10/2000 | Muir et al. .................. 280/741 |
| 6,149,746 A | | 11/2000 | Blomquist |
| 6,189,927 B1 | | 2/2001 | Mossi et al. |
| 6,234,521 B1 | | 5/2001 | Katsuda et al. |
| 6,254,121 B1 | | 7/2001 | Fowler et al. |
| 6,460,873 B1 | * | 10/2002 | Lebaudy et al. ......... 280/728.1 |

FOREIGN PATENT DOCUMENTS

| | | |
|---|---|---|
| DE | 41 16 880 A1 | 11/1992 |
| DE | 44 25 830 A1 | 5/1995 |
| DE | 195 32 666 A1 | 3/1997 |
| EP | 1110826 A1 * | 6/2001 ............ B60R/21/26 |
| FR | 2 771 356 | 5/1999 |
| JP | 6-305392 | 4/1993 |
| WO | WO 00/50270 | 8/2000 |

OTHER PUBLICATIONS

"Side Impact Protection Device", Research Disclosure (1995) Jul., No. 375, Emsworth, GB.

* cited by examiner

*Primary Examiner*—Brian L. Johnson
*Assistant Examiner*—Hau Phan
(74) *Attorney, Agent, or Firm*—Oliff & Berridge, PLC

(57) ABSTRACT

A safety device housed in a motor vehicle and used in the field of automobile safety has an impervious inflatable metal bag fixed to a support, a pyrotechnic charge, and an ignition device intended to be connected to a source of electrical current. The bag includes a first metal sheet which has a central orifice, an intermediate fixing zone attached to the support and a peripheral fixing zone and a solid domed second metal sheet which has a peripheral fixing zone. The two metal sheets are fixed together at their peripheral fixing zones. The pyrotechnic charge is contained in the bag.

9 Claims, 4 Drawing Sheets

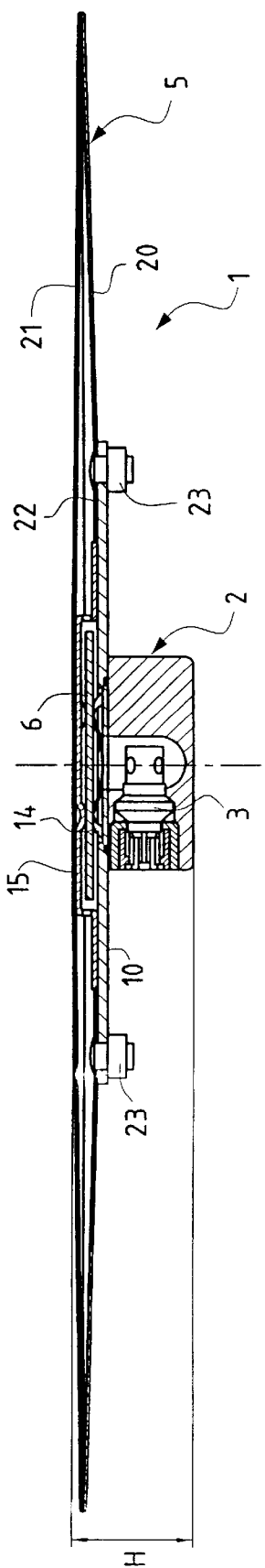
FIG.1
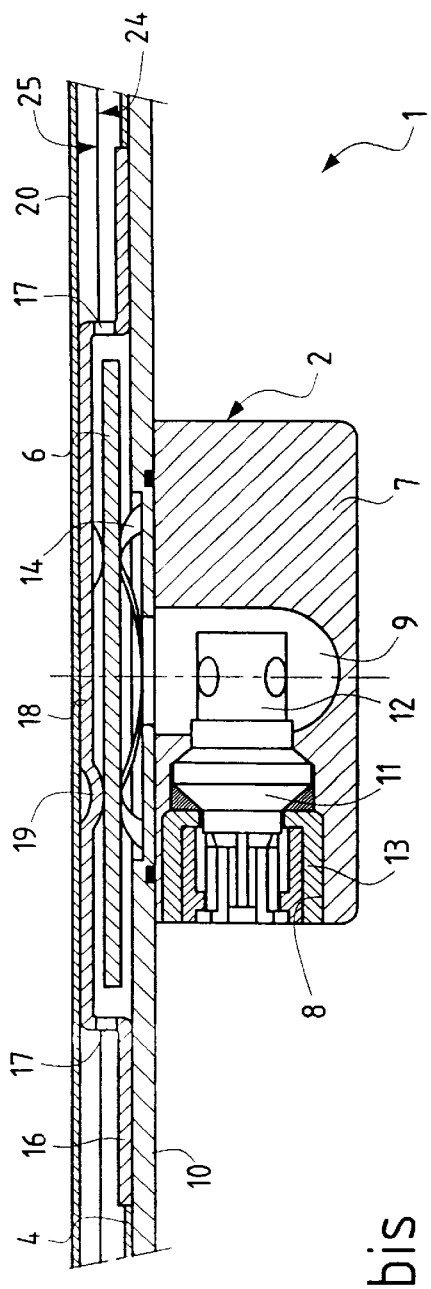
FIG.1bis

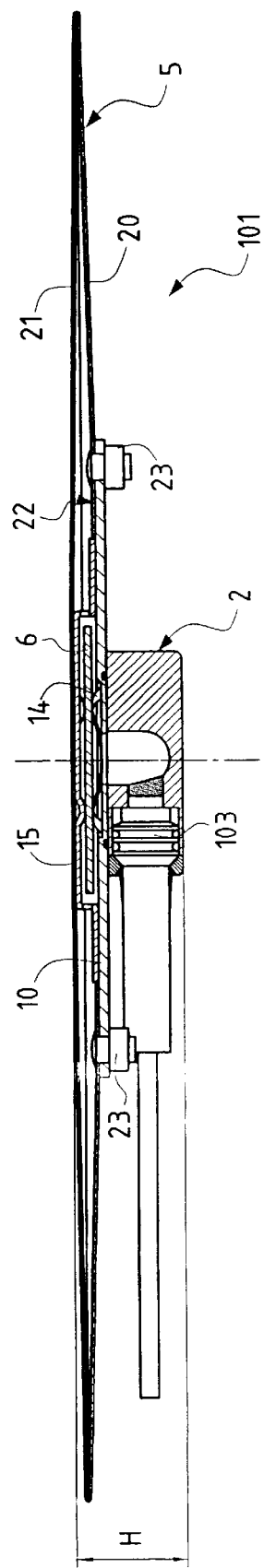
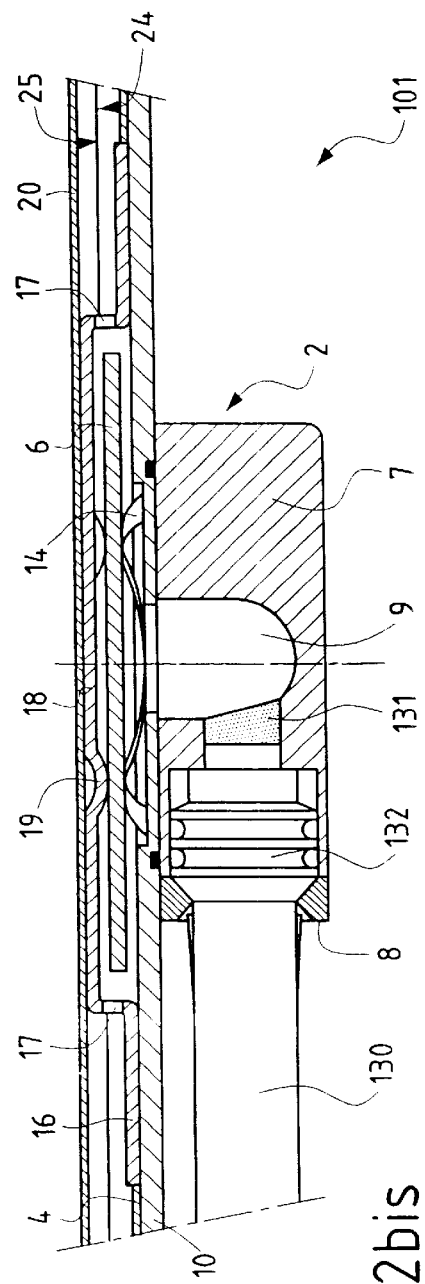

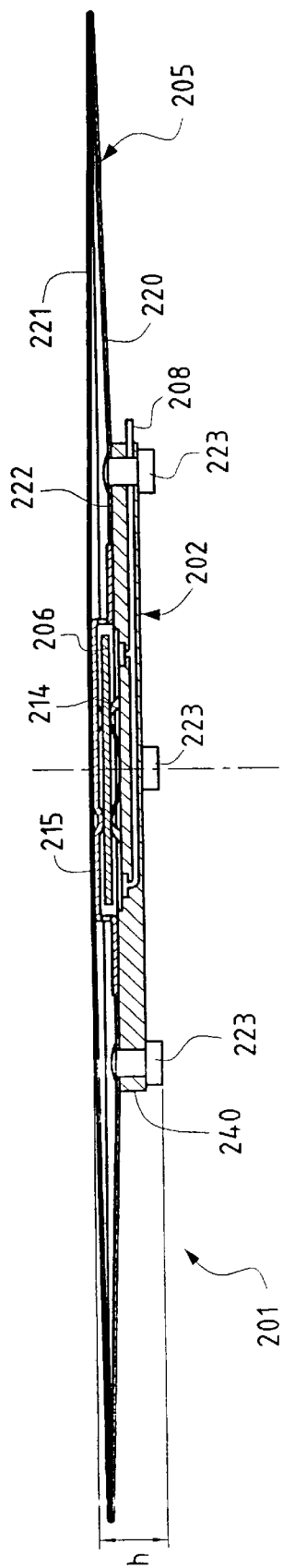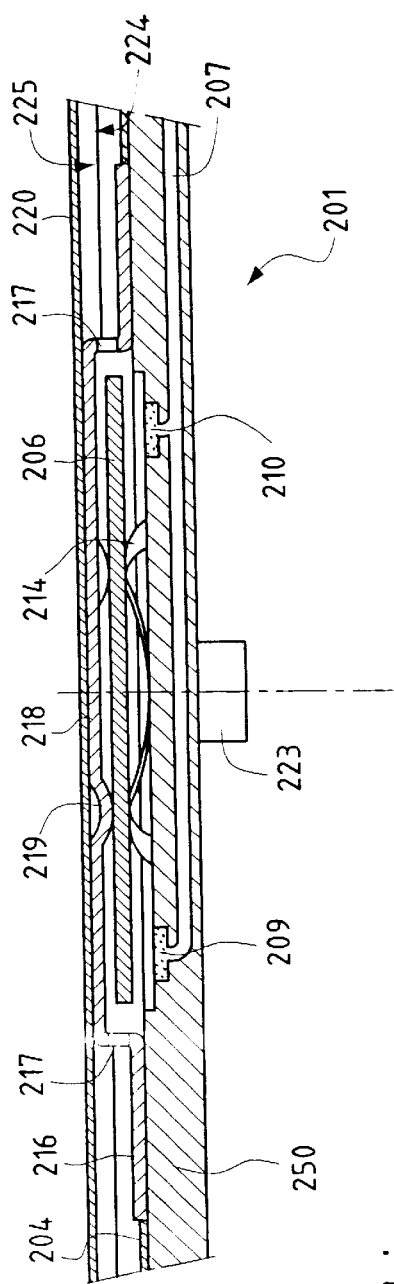

INFLATABLE METAL STRUCTURE WITH BUILT-IN PYROTECHNIC CHARGE

This is a Division of application Ser. No. 09/655,068 filed Sep. 5, 2000, now U.S. Pat. No. 6,460,873.

BACKGROUND OF THE INVENTION

1. Field of Invention

The present invention relates to the field of automobile safety and relates more particularly to a safety device intended to protect an occupant of a motor vehicle in a collision.

2. Description of Related Art

For about the last thirty years it has been proposed that the gas-generating systems be incorporated into motor vehicles to inflate conventional textile airbags intended to protect the face and torso of motor vehicle occupants in order to limit as far as possible the risk of bodily injury to which these occupants are exposed in the event of a frontal or side impact. Sometimes, as described for example in German patent application DE 41 16 880, the interior surface of these bags is even coated with a pyrotechnic lacquer.

Recently, in addition to these conventional protective devices, car manufacturers have wished to incorporate numerous safety devices aimed, on the one hand, at protecting the lower limbs of the occupants and at reducing the risk of submarining and, on the other hand, at strengthening the actual structure of the vehicle. In this type of application, the safety devices have to operate in extremely short spaces of time and it is therefore necessary to employ highly efficient pyrotechnic charges which, in very short spaces of time, generate the necessary volume of gas. These gases are often toxic and are often at a very high temperature. Conventional textile airbags must therefore not be used because they are liable, on the one hand, to be damaged by the very hot gases and, on the other hand, because of their porosity, to allow the toxic gases to pass into the cabin of the vehicle.

To alleviate this problem, safety devices each comprising a conventional gas generator connected to an impervious inflatable metal bag via a gas duct have therefore been proposed, as described in U.S. Pat. No. 5,615,914 and U.S. Pat. No. 5,839,756. However, the use of a gas generator as a separate component makes these safety devices bulky overall and too heavy, making them difficult to incorporate in great number into a vehicle.

The person skilled in the art is therefore still in search of a compact and lightweight safety device which will allow the use of highly efficient pyrotechnic charges.

SUMMARY OF THE INVENTION

The object of the present invention is to answer this problem and the invention therefore relates to a safety device housed in a motor vehicle and which comprises:
  i) an impervious inflatable metal bag fixed to a support,
  ii) a pyrotechnic charge,
  iii) an ignition device intended to be connected to a source of electrical current, characterized in that,
  iv) the impervious inflatable metal bag consists of a first metal sheet which has a central orifice, an intermediate fixing zone attached to the support and a peripheral fixing zone and of a solid domed second metal sheet which has a peripheral fixing zone, the two metal sheets being fixed together at their peripheral fixing zone,
  v) the pyrotechnic charge is contained in the impervious inflatable metal bag.

As a preference, the support consists of a cylindrical body having a flat top surface to which the first metal sheet of the impervious inflatable metal bag is fixed. This body may moreover be made using two distinct elements, the first element corresponding to the bottom part of the said body and the second element consisting of a plate attached to the said first element.

Also as a preference, a perforated piece, contained in the impervious inflatable metal bag and fixed into the flat top surface of the cylindrical body, holds the pyrotechnic charge in place.

According to a first preferred alternative form of embodiment, the pyrotechnic charge is produced in the form of at least one flat sheet, the said flat sheet being wedged between the perforated piece and a spring, itself bearing against the flat top surface of the body.

According to a second preferred alternative form of embodiment, the pyrotechnic charge consists of loose powder.

Advantageously, the pyrotechnic charge consists of a composite pyrotechnic composition comprising a silicone binder and an inorganic oxidizing charge, such as a mixture of ammonium perchlorate and sodium nitrate, for example.

According to a first preferred embodiment of the invention, the cylindrical body has a radial opening itself extended by a central recess located facing the central orifice borne by the first metal sheet.

According to a first alternative form of the first preferred embodiment of the invention, the ignition device, which consists of an electropyrotechnic igniter itself inserted into an electrical connector, is fixed into the radial opening of the cylindrical body.

According to a second alternative form of the first preferred embodiment, the ignition device consists of a pyrotechnic transmission cord and of a pyrotechnic relay charge. Advantageously, the pyrotechnic relay charge is housed in the radial opening borne by the cylindrical body, and the pyrotechnic transmission cord has one end inserted in the said radial opening and in contact with the pyrotechnic relay charge.

A safety device as described in this first preferred embodiment of the invention is very compact because, at rest, the maximum height of the said safety device corresponds only to the sum of the height of the body and of the maximum distance separating the first metal sheet from the solid domed second metal sheet.

According to a second preferred embodiment of the invention, the cylindrical body consists of a discoid plate which has a side wall, there being, passing through the said discoid plate, a radial channel which starts in the said side wall and ends in at least two widened terminations in the flat top surface. It may prove necessary to increase the number of widened terminations depending on the mass of the pyrotechnic charge employed.

As a preference, the radial channel contains two electrodes which conduct electrical current and each of the two widened terminations of the radial channel contains an ignition bead electrically connected to the two electrodes.

A safety device as described in this second preferred embodiment of the invention is even more compact because the body is in fact reduced to a discoid plate of small thickness.

In general, it may be advantageous to place seals between the first metal sheet and the flat top surface of the cylindrical body.

The present invention also relates to the use of one or more safety devices as described hereinabove:

at the front of the seat part of a passenger seat to raise this passenger in the very first moments following a collision, which makes it possible to greatly reduce the risk of submarining, in the bottom part of the dashboard so as to protect the lower limbs of the front-seat passengers of the vehicle in a collision, to strengthen certain parts of the structure of the vehicle in a collision, for example the bumpers and/or the side doors.

BRIEF DESCRIPTION OF THE DRAWINGS

Four embodiments of a safety device according to the invention are described hereinafter in FIGS. 1 to 4.

FIG. 1 is a sectioned view of a safety device according to the first alternative form of the first preferred embodiment of the invention.

FIG. 1bis is an enlarged part view of the safety device depicted in FIG. 1.

FIG. 2 is a sectioned view of a safety device according to the second alternative form of the first preferred embodiment of the invention.

FIG. 2bis is an enlarged part view of the safety device depicted in FIG. 2.

FIG. 3 is a sectioned view of a safety device according to the second preferred embodiment of the invention.

FIG. 3bis is an enlarged part view of the safety device depicted in FIG. 3.

DETAILED DESCRIPTION OF THE INVENTION

Figure 4:
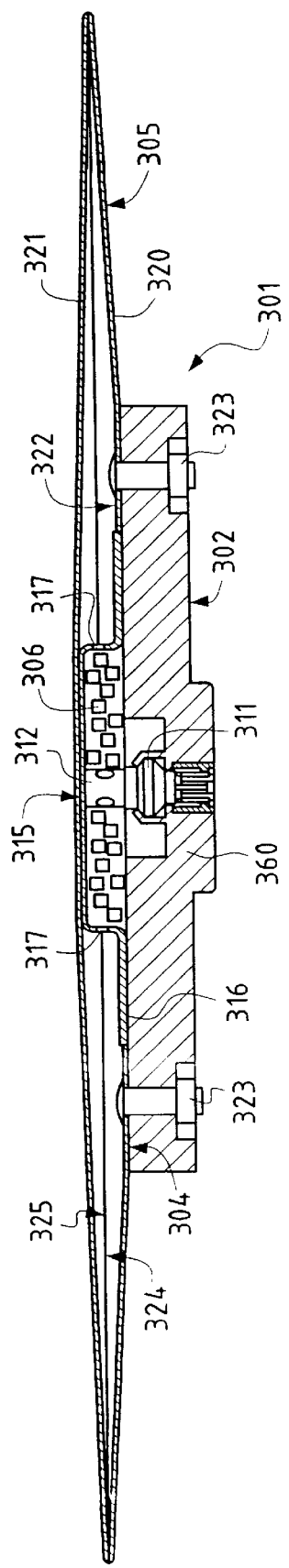
FIG. 4 is a sectioned view of a safety device in which the pyrotechnic charge consists of loose powder.

Referring to FIGS. 1, 1bis, 2 and 2bis, it can be seen that a safety device 1 according to the first alternative form of the first preferred embodiment of the invention or that a safety device 101 according to the second alternative form of the first preferred embodiment of the invention consists of a cylindrical body 2 which, on the one hand, contains an ignition device 3 or 103 which will be described in detail later on and, on the other hand, has a flat top surface 4 to which an impervious inflatable metal bag 5 containing a pyrotechnic charge is attached.

More specifically, the cylindrical body 2 consists of a lower first element 7 which has a radial opening 8 extended by a central recess 9 and of an upper second element produced in the form of a circular plate 10 with a central perforation. The lower element 7 and the circular plate 10 are fixed together by welding and in such a way that the central recess 9 lies facing the central perforation of the circular plate 10.

The pyrotechnic charge, which consists of a composite pyrotechnic composition comprising a silicone binder and an oxidizing charge based essentially on ammonium perchlorate and sodium nitrate, is produced in the form of a flat sheet 6 which is wedged between a spring 14 and a perforated piece 15. The spring 14 is placed so that it bears against the flat top surface 4 at a circular internal indentation surrounding the central perforation borne by the circular plate 10. The perforated piece 15 has the shape of a cup comprising a peripheral annulus 16 attached by welding to the top surface 4, a side wall with orifices 17 and a central disc 18 which has bosses 19 in contact with the flat sheet 6.

The impervious inflatable metal bag 5 consists of a first metal sheet 20 and of a solid domed second metal sheet 21, the two metal sheets 20, 21 being made of steel. More specifically, the first metal sheet 20 has a central orifice allowing it to encircle the annulus 16 of the perforated piece 15 and has an intermediate fixing zone 22 which is fixed by threaded fasteners into the circular plate 10 using bolts 23. The first metal sheet 20 and the second metal sheet 21 each have a peripheral fixing zone 24, 25 and are fixed together by welding at their peripheral fixing zone 24, 25.

Referring to FIGS. 1 and 1bis, it can be seen that the ignition device 3 of the safety device 1 is formed using a conventional electropyrotechnic igniter 11 which has an ignition head 12 and which is incorporated into an electrical connector 13. The ignition device 3 thus formed is inserted in the radial opening 8 in the lower element 7 in such a way that the ignition head 12 is located in the central recess 9. Electrical power can then be supplied via an electrical circuit which has a first end which plugs into the electrical connector 13 and a second end connected to a central control unit.

Referring to FIGS. 2 and 2bis, it can be seen that the ignition device 103 of the safety device 101 consists of a flexible pyrotechnic transmission cord 130 which is shown not in section in said FIGS. 2 and 2bis, and of a pyrotechnic relay charge 131. More specifically, the pyrotechnic relay charge 131 is housed in the radial opening 8 near the central recess 9. The flexible pyrotechnic transmission cord 130 has, on the one hand, a threaded first end 132 which is introduced into the radial opening and which is in contact with the said pyrotechnic relay charge 131 and, on the other hand, a second end intended to be connected to a central control unit.

In operation, the safety devices 1 and 101 act as follows. When the central control unit detects a collision entailing the triggering of the said safety device 1 or 101, it activates the corresponding ignition device 3 or 103. The latter generates hot gases in the central recess 9 of the lower element 7 and these gases pass through the central perforation in the circular plate 10 to finally initiate the combustion of the flat sheet 6 constituting the pyrotechnic charge. By combustion, this then, in a very short space of time, produces hot gases which pass through the orifices 17 of the side wall of the perforated piece 15 and allow the impervious inflatable metal bag 5 to be fully inflated, starting from its centre.

These safety devices 1, 101 are actually very compact because they have a maximum height H of the order of 2 cm.

Moreover, depending on the desired location and use of the safety device 1, 101, the first metal sheet 20 and the second metal sheet 21 may have a circular, or rectangular, or even triangular overall shape, for example.

Finally, the pyrotechnic charge may also be produced using loose powder contained in a combustible sachet which is itself held in place by the perforated piece 15.

Referring to FIGS. 3 and 3bis, it can be seen that a safety device 201 according to the second preferred embodiment of the invention consists of a cylindrical body 202 which, on the one hand, contains an ignition device and, on the other hand, has a flat top surface 204 to which an impervious inflatable metal bag 205 containing a pyrotechnic charge is attached.

More specifically, the body 202 has the shape of a discoid plate 250. This discoid plate 250 has a side wall 240 and comprises a radial channel 207 which, on the one hand, begins in the said side wall 240 and, on the other hand, ends in two widened terminations in the flat top surface 204. The ignition device consists of two electrical wires contained in a sheath 208, this sheath 208 itself being slipped into the radial channel 207. A first ignition bead 209 is introduced into one of the two widened terminations of the radial channel 207 and a second ignition bead 210 is introduced into the other widened termination. These two ignition beads 209, 210 are connected in parallel to the two electrical wires contained in the sheath 208 and the latter are connected to an electronic central unit.

The pyrotechnic charge, which consists of a composite pyrotechnic composition comprising a silicone binder and an oxidizing charge based essentially on ammonium perchlorate and sodium nitrate, is produced in the form of a flat sheet 206 which is wedged between a spring 214 placed bearing against the flat top surface 204 and a perforated piece 215. The latter has the shape of a cup comprising a peripheral annulus 216 attached by welding to the flat top surface 204, a side wall with orifices 217, and a central disc 218 with bosses 219 which are in contact with the flat sheet 206.

The impervious inflatable metal bag 205 consists of a first metal sheet 220 and of a solid domed second metal sheet 221, the two metal sheets being made of steel. More precisely, the first metal sheet 220 has an orifice allowing it to encircle the annulus 216 of the perforated piece 215 and has an intermediate fixing zone 222 which is fixed by threaded fasteners into the discoid plate 250 using bolts 223. The first metal sheet 220 and the second metal sheet 221 each have a peripheral fixing zone 224, 225 and are fixed together by welding at their peripheral fixing zone 224, 225.

In operation, the safety device 201 acts as follows. When the electronic central unit detects a collision entailing the triggering of the said safety device 201, it delivers electrical current into the two electrical wires and this causes the initiation of the two ignition beads 209, 210. These produce hot gases which come directly into contact with the flat sheet 206 constituting the pyrotechnic charge. This flat sheet 206 then generates hot gases which pass through the orifices 217 of the side wall of the perforated piece 215 and allow the impervious inflatable metal bag 205 to be fully inflated, starting from its centre.

This safety device 201 is even more compact than those described previously and has a maximum height h of the order of 1 cm.

Furthermore, depending on the desired location and use of the safety device 201, the first metal sheet 220 and the second metal sheet 221 may have a circular or rectangular or even triangular overall shape, for example.

Finally, the pyrotechnic charge may also be produced using loose powder contained in a combustible sachet which is itself held in place by the perforated piece 215.

Referring to FIG. 4, it can be seen that a safety device 301 according to another preferred alternative form of embodiment of the invention consists of a cylindrical body 302 in which an ignition device is fixed, the said body 302 having a flat top surface 304 to which an impervious inflatable metal bag 305 containing a pyrotechnic charge is attached.

More precisely, the body 302 has the shape of a plate with a central discontinuity 360. The latter has a central orifice which is itself extended upwards by a ring. The ignition device, produced using a conventional cylindrical electro-pyrotechnic igniter 311 fitted with an ignition head 312 and connected to a central control unit, is then inserted into the said central orifice and the ring is then knocked over onto the igniter 311 so that this igniter is held in place by a form of crimping. The cylindrical igniter 311 thus has an axis of revolution which is coincident with that of the safety device 301.

The pyrotechnic charge, which consists of a composite pyrotechnic composition comprising a silicone binder and an oxidizing charge based essentially on ammonium perchlorate and sodium nitrate, is produced in the form of a loose powder 306 which is contained in a combustible sachet (not depicted) wedged between the flat top surface 304 and a perforated piece 315. The latter is in the shape of a cup comprising a peripheral annulus 316 at ached by welding to the flat top surface 304, a side wall with orifices 317 and a central disc.

The impervious inflatable metal bag 305 consists of a first metal sheet 320 and of a solid domed second metal sheet 321, the two metal sheets being made of steel. More specifically, the first metal sheet 320 has an orifice allowing it to encircle the annulus 316 of the perforated piece 315 and has an intermediate fixing zone 322 which is fixed by threaded fasteners into the body 302 using bolts 323. The first metal sheet 320 and the second metal sheet 321 each have a peripheral fixing zone 324, 325 and are fixed together by welding at their peripheral fixing zone 324, 325.

In operation, the safety device 301 acts as follows. When the central control unit detects a collision entailing the triggering of the said safety device 301, it activates the igniter 311 which then generates hot gases dispatched directly into contact with the loose powder 306. By combustion, this powder, in a very short space of time, produces hot gases which pass through the orifices 317 in the perforated piece 315 and which allow the impervious inflatable metal bag 305 to be fully inflated starting from its centre.

As described above, the first metal sheet 320 and the second metal sheet 321 may have a circular or rectangular or even triangular overall shape, for example.

What is claimed is:

1. A safety device housed in a motor vehicle comprising:
   i) an impervious inflatable metal bag fixed to a support;
   ii) a pyrotechnic charge;
   iii) an ignition device intended to be connected to a source of electrical current, wherein,
   iv) the impervious inflatable metal bag includes a first metal sheet which has a central orifice, an intermediate fixing zone attached to the support and a peripheral fixing zone and a solid domed second metal sheet which has a peripheral fixing zone, the two metal sheets being fixed together at their peripheral fixing zones, wherein,
   v) the pyrotechnic charge is contained in the impervious inflatable metal bag, wherein,
   vi) the support consists of a cylindrical body having a flat top surface to which the first metal sheet is fixed, and wherein,
   vii) the body includes a discoid plate which has a side wall, and passing through the discoid plate is a radial channel which starts in the side wall and ends in at least two widened terminations in the flat top surface.

2. The safety device according to claim 1, wherein,
   i) the radial channel contains two electrodes which conduct electrical current, and
   ii) each of the two widened terminations of the radial channel contains an ignition bead.

3. The safety device according to claim 1, wherein a perforated piece, contained in the bag and fixed into the flat top surface of the body, holds the pyrotechnic charge in place.

4. The safety device according to claim 3, wherein the pyrotechnic charge is produced in the form of a flat sheet, the flat sheet being wedged between the perforated piece and a spring, the spring bearing against the flat top surface of the body.

5. The safety device according to claim 4, wherein the pyrotechnic charge includes a composite pyrotechnic composition comprising a silicone binder and an inorganic oxidizing charge.

6. The safety device according to claim 3, wherein the pyrotechnic charge consists of loose powder.

7. The safety device according to claim 1, wherein the safety device is positioned at the front of the seat part of a passenger seat to raise the passenger in the moments following a collision.

8. The safety device according to claim 1, wherein the safety device is positioned in the bottom part of the dashboard so as to protect the lower limbs of the front-seat passengers of the vehicle in a collision.

9. The safety device according to claim 1, wherein the safety device is positioned to strengthen certain parts of the structure of the vehicle in a collision.

* * * * *